Feb. 5, 1935.  G. W. BAILEY  1,990,218
VISUAL TEST APPARATUS
Filed Dec. 21, 1932
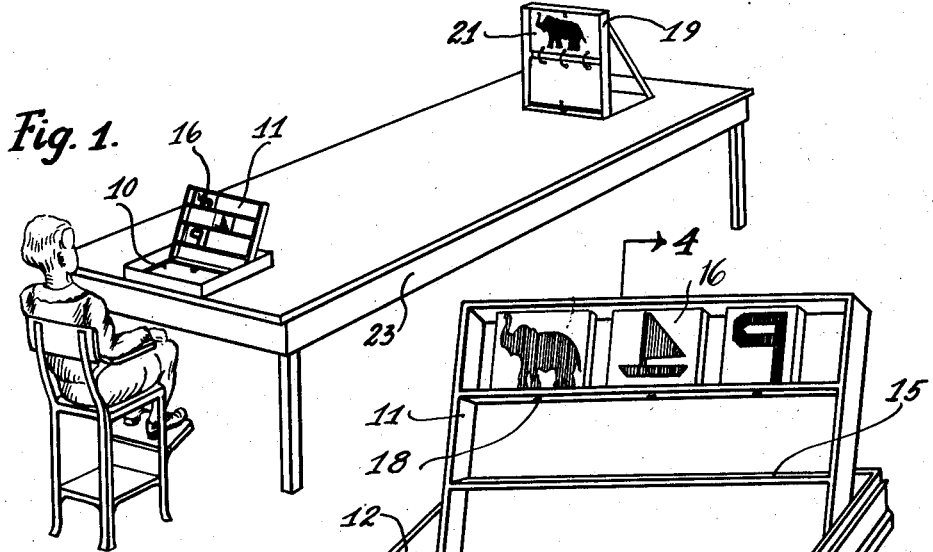
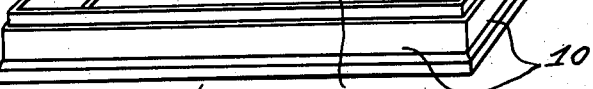
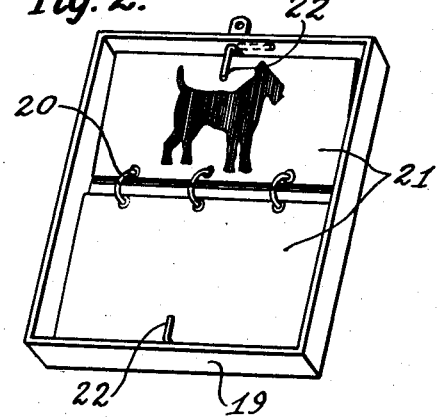
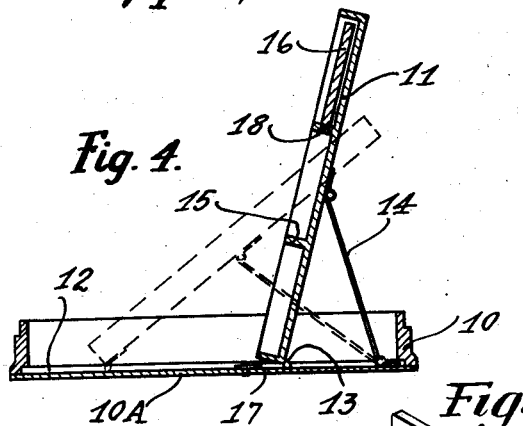
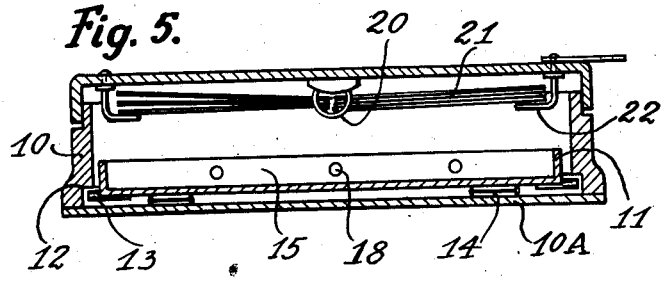
GEORGE W. BAILEY.
INVENTOR
BY Louis Illmer
ATTORNEY Patented Feb. 5, 1935

1,990,218

UNITED STATES PATENT OFFICE 1,990,218

VISUAL TEST APPARATUS

George W. Bailey, Cortland, N. Y.

Application December 21, 1932, Serial No. 648,256

4 Claims. (Cl. 88—20)

This invention relates to an improved means for determining the acuteness of perception on part of patients by the use of intermediary reference models of the manipulative type, and more particularly pertains to novel apparatus adapted to test defective vision on part of children of pre-school age, illiterate adults, deaf mutes, and others who cannot adequately be served by conventional eye test means.

As an inherent limitation of such conventional examination, the patient is obliged accurately to describe his observations to the examiner, whereas by the use of my improved visual treatment, no responsive vocal expression is required; instead, the patient merely indicates his perceptions by selectively handling and finally picking out one of the several distinctive model blocks that most nearly conforms in shape to the object then being exhibited upon a distant reference chart. The perimetric contour of such reference blocks is preferably trimmed to follow its characteristic representation.

The present test procedure rests upon a psychological basis in that where a patient is letter ignorant, his visual acuity can more accurately be verified by means of my selective symbolic method. In lieu of lettered charts, the treatment herein contemplated preferably provides for a group of distinctive silhouetted symbols or assortment of demountable reference models of the individual block type that are placed within sight and convenient reach of such immature patient. Instead of being obliged to describe his observations in words, the patient is preferably directed to a given distant test object and instructed or otherwise persuaded to recognize this exhibit in terms of a concrete model that is similar in symbolic outline to said object.

My improved reference chart may be equipt with a series of different graphic representations or objects that are changeably mounted and respectively correspond in sharp black outline to some one of the model symbols. Each such chart character may be individually impressed in various predetermined test sizes upon different white cards or the like. The examiner first selectively exhibits one such object in line of the patient's vision, preferably at a prescribed distance from the eye in conformity with the Snellen standard of graded sight testing. The patient is then requested to identify this particular object by handling and choosing from the various models, the counterpart which appears most nearly to correspond in outline with said exhibited object. As a further refinement in method, the symbols of my various reference models may as a group be laterally offset from the aforesaid line of vision and arranged to lie in a common plane that is kept substantially perpendicular to said line. As will be understood, the graphic representations herein utilized preferably relate to common household articles, birds, animals, etc., likely to be quite familiar to a small child, although alphabetic letters may also be resorted to.

After having successively changed the size of a given chart symbol and repeatedly modified the outline thereof, the resulting findings generally enable an experienced examiner to duplicate the measurements obtained by the usual eye testing method, notwithstanding that the patient may be unable to read or be still too young to effectually respond to the conventional reference letters. The eye test herein devised is predicated upon the astuteness of a child in recognizing and discriminating between distinctive shapes of such distant objects in terms of an identical model outline close at hand. I have found that the average child is capable of properly satisfying said test, which in turn has enabled me to correctly prescribe needed eye glasses for such special patients.

The object of my invention is to provide for a simple eye test method of the character indicated and to contrive the necessary instrumentalities by which it may be efficiently executed. To this end, and the accomplishment of other new and useful results having to do with the measurement of comparative acumen, as applied to eye testing purposes, said invention further consists in novel features of structure and manipulation, all of which will hereinafter be more fully set forth.

Reference is had to the accompanying one sheet of drawings which is illustrative of an exemplification of my invention, and in which:

Fig. 1 is a perspective view of a model holding cabinet placed in a cooperative relationship with my distant test chart.

Fig. 2 shows an enlarged perspective detail of said chart, while Fig. 3 represents a similar view of said cabinet having its slidable tray erected into operative position.

Fig. 4 illustrates certain structural features of my cabinet as taken along line 4—4 of Fig. 3; and Fig. 5 cross-sectionally shows the collapsed cabinet and cover assembled for transport or storage purposes.

Fig. 6 shows in perspective a model that is trimmed to correspond with its distinctive profile shape.

Referring now in detail to said drawing, the numeral 10 designates a model cabinet of open top, box shape having a relatively flat tray or block carrier 11 shiftably mounted therein. The sidewalls of said cabinet may be fabricated from adjoined mouldings shaped to form an endless guide groove 12 that is interiorly undercut in the region of the base board 10A. The tray may be provided with a pair of trunnions such as 13 that respectively slide in oppositely disposed groove portions. In addition, the bottom of said tray may be equipped with a pair of equalizing guide links such as 14 that are respectively hinged to the cabinet base board to allow of said tray being bodily shifted without cocking from erected position (see Fig. 3) into collapsed position as in Fig. 5, or vice versa.

When collapsed, the tray lies contiguous and parallel to said base board and is designed to provide for a storage space thereabove. The tray may be equipt with one or more partition strips such as 15 which divide the upturned tray into elongated block compartments. In erected position, each such strip serves as a shelflike ledge upon which to demountably support an assortment of independent flat blocklike models such as 16. A stop lug 17 carried upon the base board, retains the tray in erected mid position and also provides for cabinet space into which any discarded models may be dropped.

By bodily lifting the erected tray away from the stop and swinging its bottommost end forwardly, said tray together with the various reference blocks may readily be let down into the cabinet without allowing the descending rows of thin blocks to drop out of place. The several blocks may be respectively provided with dowel or other retaining means 18 serving to spacedly locate the same lengthwise of the supporting ledge.

Each model represents a distinctive silhouetted symbol of the kind previously defined, which is preferably imprinted in heavy black outline and mounted upon an easily handled wooden block or the like. The outline of each such silhouette is preferably cut out by scroll saw means to emphasize the characteristic perimetric shape given thereto in the fashion detailed in Fig. 6. In operative position, the respective models lean inwardly against the erected tray and are placed in a slightly offset relation below the line of vision but within convenient reach of a seated patient in the fashion indicated in Fig. 1.

Details of a suitable reference chart are shown in Fig. 2, this being preferably embodied in the removable cover member 19 adapted to close the open top of my cabinet. The cover interior may sustain a plurality of retractible split loops 20 adapted to hingedly hold a stack of loose leaf cards such as 21 and which cards respectively have sharply imprinted on one side face thereof, a definite graphic representation of an object that corresponds in outline with one of the distinctive block symbols. Each such representation may be imprinted in several different contour sizes upon separate cards to constitute a complete test chart. Said cover may be provided with suitable means to hang or otherwise support the removed cover at a distance from the patient and a retaining clip such as 22, may be used to releasably hold a selected card in operative position for test purposes. In accordance with the Snellen standard of eye measurement, a certain prescribed size of object is employed in relation to the distance at which said object is to be located from the observer, and this in turn serves as an arbitrary unit of reference for normal vision. The similar duplicate cards are then graded in size of outline and made comparatively larger or smaller than such standard in conformity with general recognized test methods. As will be understood, the examiner endeavors to improve the patient's natural or unaided vision by the application of different spherical test lenses in the customary manner and determines the resulting quality of vision by the patient's performance in selecting an appropriate reference block.

It will be observed that my erected cabinet is placed vertically ahead of the patient while the cited reference chart is mounted at a prescribed distance therebehind and faced toward the patient, a mounting table 23 here serving as a spacing medium therebetween. The required equipment having been depicted and explicitly described, it is thought the intended mode of utilizing the same will be apparent to those skilled in this art.

To recapitulate, after a certain symbolic object of relatively large size has been exhibited and the patient has correctly interpreted the same by choosing the model corresponding thereto, the examiner thereupon changes the exposed chart card to a smaller sized or different object and repeats said test until the desired degree of visual acuity has been ascertained. In finally checking and fitting the finished eye glasses, the patient may again be subjected to a like comparative treatment, it being obvious that one eye is normally covered while the other is being tested for vision.

After an eye test has been completed, my device may be compactly stored away by latching the complementary clips 22 over the free card ends and assembling the cover in place as in Fig. 5. The height of the cabinet sidewalls is preferably made sufficiently deep to allow the split stack of cards to lie face downwardly over the collapsed tray, as shown in Fig. 5.

The method herein advocated is peculiarly fitted for testing the eyes of smaller children since the defined procedure is in the nature of a game likely to prove of interest and makes no demands beyond the range of their limited experience. The described block medium may also be utilized to measure the visual acuity of foreign persons or deaf mutes who may be unable to understand the spoken directions of an examiner, in which event the required simple interrogatories may be carried on by sign language or manual interpretation. My method is also applicable to certain purposes other than prescribing eye glasses, and may with advantage be employed in kindergarten or the like teaching work to determine or train the acuteness of perception in certain pupils.

It is believed that the foregoing specification when read in connection with the accompanying drawing, makes evident the intended purpose, the preferred manipulation and advantages resulting from my improved mode of determining visual acuity or the like acumen on part of special patients, it being understood that the novel features thereof are subject to wide latitude in practical application and that the described objects may be suitably projected upon a screen or mirrored in the conventional manner, also that various other modifications may be resorted to in accomplishing the end in view, all without departing from the spirit and scope of my invention as defined in the accompanying claims.

I claim:

1. An eye testing apparatus comprising an open top cabinet, a carrier mounted to collapse within the cabinet confines and to move into erected position, an assortment of reference blocks demountably arranged upon and independently removable from the erected carrier, each such block being given a distinctive representation, and chart means including a detachable cover member provided with a stack of object cards respectively corresponding in outline to certain of the block representations, said cover serving to close the cabinet after the carrier has been collapsed.

2. An eye testing apparatus comprising an open top cabinet equipped with tray means, manipulative reference models demountably arranged upon and independently removable from the tray and which models are each given a distinctive representation, and a detachable cover member serving to close the cabinet and which cover includes a stack of changeable object cards respectively corresponding in outline to certain of the model representations, said chart means being placeable in a distant cooperative relation to the tray so that all the models and one of said objects fall within the field of vision of a common observer when the models are kept within reach to allow the observer to select therefrom the particular model that most nearly corresponds to the aforesaid one object.

3. An eye testing apparatus comprising means for mounting thereon a group of assorted intermediary reference models that are independently removable and each given a distinctive representation, and chart means provided with changeable objects respectively corresponding in outline to certain of the model representations and which chart is placed in a cooperative distant relation with respect to the group of reference models, all of said models and one of said objects falling within the field of vision of a common observer and which models are kept within reach to allow the observer to selectively remove the particular model whose representation most nearly corresponds to said one object.

4. A test apparatus comprising means mounting an assortment of separable silhouetted reference blocks that are each given a distinctive profile shape and which blocks have their respective perimetric contours formed to correspond to the profile shape given thereto, and chart means provided with changeable objects that respectively correspond in outline to certain of the aforesaid profile shapes, and which chart is placed in a cooperative distant relation with respect to said assortment of reference blocks to fall within the field of vision of a common observer.

GEORGE W. BAILEY.